United States Patent
Roper

[11] 3,762,241
[45] Oct. 2, 1973

[54] DRIVE MECHANISM
[75] Inventor: Daniel W. Roper, Rochester, Mich.
[73] Assignee: Eaton Corporation, Cleveland, Ohio
[22] Filed: Jan. 12, 1972
[21] Appl. No.: 217,326

[52] U.S. Cl. .................... 74/711, 192/35, 192/54
[51] Int. Cl. ... F16h 1/44, F16d 43/286, F16d 43/18
[58] Field of Search ............... 74/711; 192/35, 54, 192/58

[56] References Cited
UNITED STATES PATENTS

| 3,572,165 | 3/1971 | Roper | 74/711 |
| 1,586,861 | 6/1926 | Taylor | 74/711 |
| 2,086,954 | 7/1937 | Fawick | 192/54 X |
| 2,351,996 | 6/1944 | Morgan | 192/54 |
| 2,431,272 | 11/1947 | Mynbsen et al. | 74/711 |
| 2,855,805 | 10/1958 | Fallon | 74/711 |
| 2,932,218 | 4/1960 | Russell | 74/711 |
| 3,448,636 | 6/1969 | Roper et al. | 74/711 |

Primary Examiner—Arthur T. McKeon
Attorney—Raymond D. Foltz

[57] ABSTRACT

An improved drive mechanism includes a regenerative self energizing clutch assembly which is operated by an actuator from a fully disengaged condition to an intermediate condition when a predetermined speed of relative rotation is present between the driving and driven members. When the clutch assembly is in the intermediate condition it generates self energizing forces which automatically complete the actuation of the clutch assembly to a fully engaged condition. In the fully engaged condition, the clutch assembly retards the relative rotation between the driving and driven members.

3 Claims, 6 Drawing Figures

DRIVE MECHANISM

The present invention relates generally to a drive mechanism, and more particularly to a differential drive mechanism having a self energizing clutch assembly which interconnects driving and driven members when a predetermined speed of relative rotation is present between the driving and driven members.

A known differential drive mechanism is used in the drive train of a vehicle and includes a carrier and differential gearing mounted on the carrier. The differential gearing includes a pair of side gears and pinion gears meshing therewith. The carrier is driven by a prime mover such as an automobile engine which in turn rotates the pinion gears. The pinion gears in turn rotate the side gears which are drivingly connected to the wheels to thereby drive the vehicle.

When one of the wheels looses traction with the surface with the road, the drive mechanism begins to differentiate and the power is transmitted from the engine to the wheel which has lost traction and that wheel consequently begins to spin while the other wheel is not driven. When such a situation occurs, it is essential for the drive mechanism to "lock" so that one of the side gears is locked with respect to the carrier. Consequently, both of the side gears rotate at the same speed and the drive mechanism is not allowed to differentiate. In such a locked up condition the wheel which has traction with the road will be driven at the same speed as the other wheel to thereby move the vehicle. When the vehicle is moved so that the wheel which lost traction with the road regains traction, the drive mechanism returns to its original condition where differentiation may occur.

It is important to note that the locked up condition must not occur until the wheels are rotating relative to each other above a predetermined level. For example, the differential gear assembly must be able to differentiate when the vehicle goes around a corner. In such a case, the wheel on the inside of the turn will rotate at a slower speed than the wheel on the outside of the turn and the differential will allow such differentiation.

One known differential of the limited-slip type includes a roller clutch which is actuated to an operated condition by actuating forces generated in response to a predetermined rate of relative rotation between driving and driven members. In the operated condition, the roller clutch retards relative rotation between the driving and driven members. The clutch is actuated to the operated condition by its actuator mechanism. Roper U.S. PAT. No. 3,324,744 illustrates such a differential.

Another known limited-slip differential utilizes a friction clutch of the cone type. A differential carrier member, at least one side gear member and a clutch means for retarding relative rotation between the carrier and the side gear is provided in such a differential. The clutch means includes a generally conical clutch element which is moved by an actuator into a pressure relationship with one of the members to retard relative rotation between the side gear and the carrier member. Such a known differential is disclosed in Roper U.S. Pat. No. 3,572,165.

One of the problems inherent in known limited-slip differential constructions is the occurrence of a rapid lock-up under the influence of the clutch actuator. This rapid lock-up results in shock impact loading of the differential.

The present invention is directed to the solution of the impact loading problem and, specifically, provides for an extremely smooth engagement of the clutch for locking the side gear and differential carrier together. Specifically, the present invention utilizes a self-energizing clutch which functions to smoothly lock-up the side gear and differential carrier in response to a predetermined speed of relative rotation therebetween. When the predetermined speed of relative rotation is present, an actuator effects operation of the clutch from a disengaged condition to an intermediate condition under the influence of an initial actuation force which is insufficient to operate the clutch to a fully engaged condition. Self-energizing forces are automatically generated by the clutch when it is actuated to the intermediate condition to effect operation of the clutch to the fully engaged condition.

Accordingly, it is an object of the present invention to provide a new and improved drive mechanism of the limited slip differential type in which a clutch for locking up parts of the differential is a self-energizing clutch.

It is another object of the present invention to provide a drive mechanism comprising a carrier, differential gearing mounted on the carrier which includes a pair of side gears and pinion gears meshing therewith and a regenerative self-energizing clutch system operably associated with one of the side gears to prevent relative rotation between the side gears and the carrier upon actuation thereof when the relative rotation between the side gears or a side gear and the carrier exceeds a predetermined level.

Another object of the present invention is to provide a drive mechanism comprising driving and driven members, a self-energizing clutch which is initially actuated to an intermediate condition when the speed relative rotation between the members exceeds a predetermined level and wherein the self-energizing clutch includes means for automatically generating a force to effect operation of the clutch from the intermediate condition to a fully engaged condition.

Another object of the present invention is to provide a new and improved drive mechanism having a regenerative self-energizing clutch assembly which is operable between a first condition wherein a pair of members are capable of rotating relative to each other and a second condition wherein relative rotation between the members is retarded, and wherein the clutch assembly includes a clutch element drivingly connected to one of the members and means for urging clutch surfaces on the clutch element into engagement with cooperating clutch surfaces on the other member when the clutch assembly is in the second condition, after initial actuation of the clutch system by an actuator and which means for urging engagement between the clutch surfaces is self-energizing to continually increase the retarding force between the member as a result of the previous retarding force in a self-energizing manner.

These and other objects and features of the invention will become more apparent upon a reading of the following description taken in connection with the accompanying drawings wherein.

Figure 1:
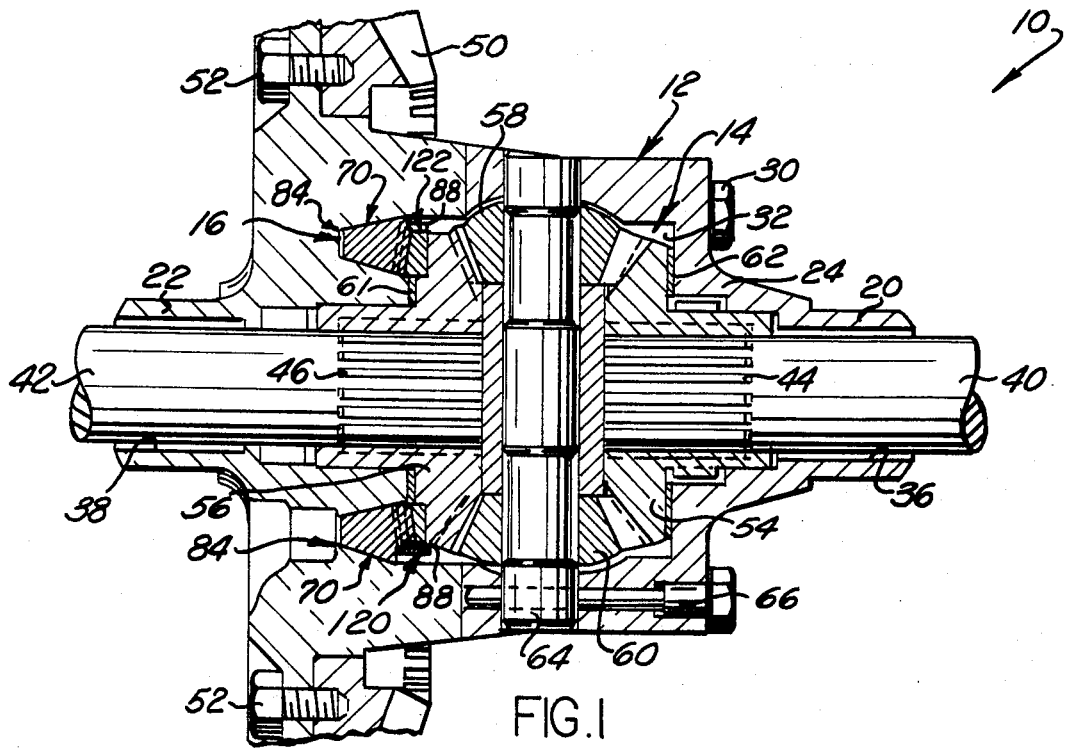
FIG. 1 is a sectional view of a differential mechanism embodying the present invention.

The present invention provides a new and improved drive mechanism which includes a regenerative self-energizing clutch assembly which is operable to interconnect driving and driven members. The regenerative self-energizing clutch assembly includes a clutch element mounted for rotation with one of the members and having generally conical clutch surfaces. These conical clutch surfaces are engageable with complemental clutch surfaces on the other member to retard relative rotation between the driving and driven members. The clutch assembly includes an actuator for operating the clutch assembly from a disengaged condition to an intermediate condition with a relatively small initial actuation force upon the occurrence of a predetermined speed of relative rotation between the driving and driven members. Once the clutch assembly has been operated to the intermediate condition by the actuator, the clutch assembly generates self-energizing forces to effect operation of the clutch assembly to the fully engaged condition. It should be noted that the initial actuation force provided by the actuator is of insufficient magnitude to operate the clutch assembly from the disengaged condition to the fully engaged condition. While the drive mechanism of the present invention is applicable to different environments, it is particularly adapted for use in a vehicle as a differential. Accordingly, as representative of a preferred embodiment of the present invention, the drawings illustrate a differential drive mechanism or assembly 10.

The differential drive assembly 10 is especially suitable for use in driving ground or surface engaging traction wheels of a vehicle. The differential drive assembly 10 includes a rotatable planet gear carrier or casing 12, a differential gear train 14, and a regenerative self-energizing clutch assembly 16. The clutch assembly 16 is operable to connect one of the gears of the gear train 14 to the planet gear carrier 12 to retard relative rotation between the gears and the carrier 12.

The planet gear carrier 12 includes a pair of support portions 20 and 22, adapted to be received in bearings of a supporting structure, such as an axle housing, not shown, by which the carrier 12 is rotatably supported. The carrier 12 further includes a pair of members 24, 26 which are integrally formed with the support portions 20, 22, respectively, and are secured together by screws 30 (only one of which is illustrated). The members 24, 26 define a gear chamber 32 in which the gear train 14 and the regenerative self-energizing clutch assembly 16 are located. The support portions 20, 22 are provided with axial openings 36, 38 which communicate with the chamber 32 and receive or accommodate driven or power output means as represented by axle shafts 40, 42, respectively, whose outer end portions are connected with traction wheels, or the like, not shown, and those inner, or adjacent end portions are connected with the gear train 14 by splines 44, 46 which are formed on the end of the shafts 40, 42.

The differential drive assembly 10 includes a ring gear 50 extending around and mounted on the carrier 12 by means of connecting screws 52 which extend through a flange portion of the planet carrier 12. A suitable drive pinion, not shown, meshes with the ring gear 50 and represents the power input means for the differential drive assembly or mechanism 10 and upon rotation effects rotation of the ring gear 50 to rotate the planet carrier 12. The planet carrier 12 and ring gear 50 are located in a casing (not shown) which is at least partially filled with oil which lubricates the differential gear train 14 and clutch assembly 16.

The gear train 14 is operable to transmit the rotary motion of the planet carrier 12 to the output shafts 40, 42. The gear train 14 comprises a pair of bevel side gears 54, 56 and a group of bevel pinion planetary gears 58, 60 disposed between and meshed in engagement with the side gears 54, 56 for drivingly connecting the latter. The side gears 54 and 56 are retained against outward movement by thrust washers 61 and 62. The planetary gears 58, 60 are rotatably supported by the carrier 12 by means of a pinion shaft 64 extending across the gear chamber 32 and secured to the carrier 12 by an anchor pin 66.

The side gears 54, 56 and pinion gears 58, 60 are, in the preferred embodiment, all bevel gears of conventional form as far as the teeth thereof are concerned, and the tooth profiles are of a conventional shape having pressure angle values coming within the usual range of such values. The side gears 54, 56 are provided with splines which mesh with splines 44, 46 on the shafts 40, 42 to drivingly connect the side gears 54, 56 to the shafts 40, 42, respectively.

Figure 6:
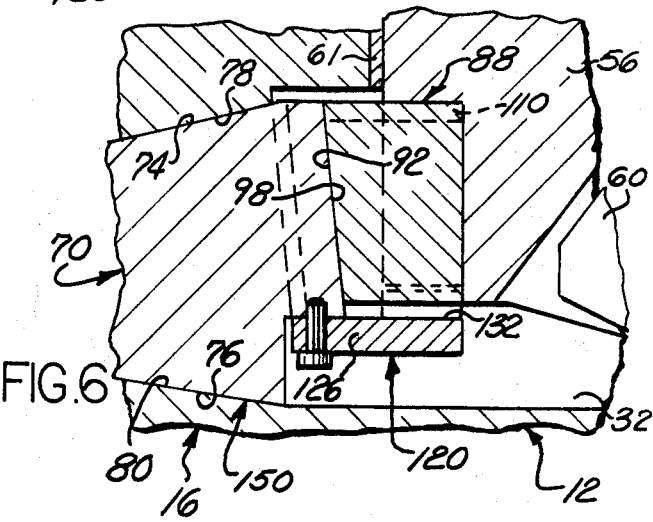
FIG. 6 is a fragmentary sectional view, similar to FIG. 2, illustrating the clutch assembly in the engaged condition.

In accordance with a feature of the present invention, the regenerative self-energizing clutch assembly 16 is operable between a disengaged condition (FIG. 2) wherein the axle shafts 40 and 42 are freely rotatable relative to each other through an intermediate condition to an engaged condition (FIG. 6) wherein the clutch assembly 16 drivingly interconnects the axle shafts 40 and 42 to retard relative rotation therebetween. When the clutch assembly 16 is in the disengaged condition of FIG. 2, generally conical clutch surfaces 74 and 76 on an annular steel clutch element or member 70 are axially spaced apart from complemental inwardly sloping clutch surfaces 78 and 80 formed by an annular recess 84 in the steel carrier 12. This axial spacing between the steel clutch surfaces enables the carrier 12 to be freely rotated relative to the clutch element 70 when the clutch assembly 16 is disengaged.

Figure 2:
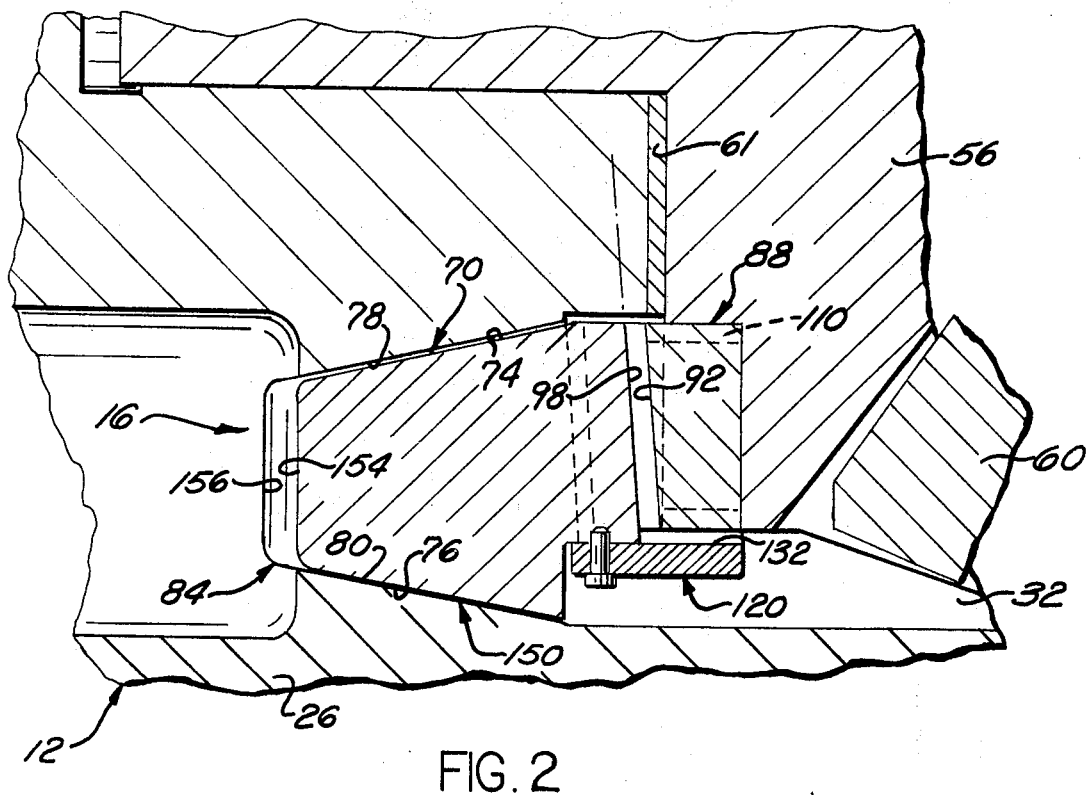
FIG. 2 is a fragmentary sectional view, on an enlarged scale, illustrating the structure of a clutch assembly of the differential mechanism of FIG. 1, the clutch assembly being shown in a disengaged condition.

When the clutch assembly 16 is engaged, the clutch surfaces 74 and 76 on the clutch element 70 are pressed axially against the clutch surfaces 78 and 80 by a cam element or member 88. This frictional engagement between the clutch surfaces 74, 76, 78 and 80 retards rotation of the carrier 12 relative to the clutch element 70. The conical clutch surfaces 74, 76 are disposed on planes which intersect each other at an acute angle and extend at acute angles to the axes of rotation of the axle shafts 40 and 42 to provide the clutch element 70 with a generally wedge shaped cross sectional configuration (FIG. 2). This wedge shaped cross sectional configuration of the clutch element 70 tends to result in firm engagement of the clutch element with the complemental wedge shaped recess 84 to thereby tend to maximize the frictional resistance to movement between the clutch surfaces 74, 76 78 and 80.

Figure 3:
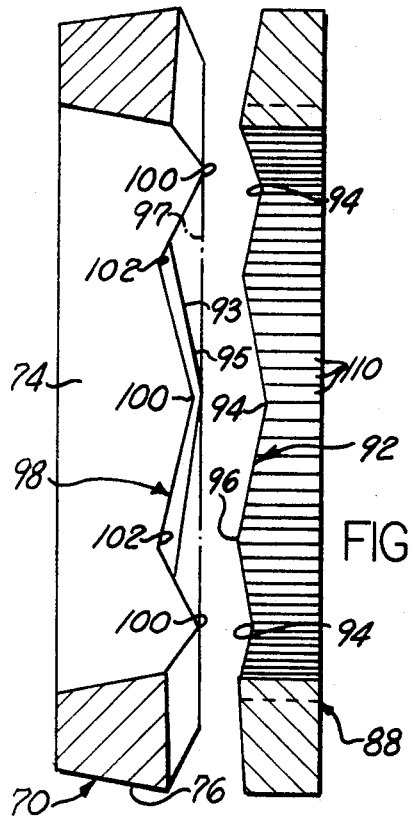
FIG. 3 is a sectional view of a wedge shaped clutch element and a cam element for pressing generally conical clutch surfaces of the clutch element against cooperating clutch surfaces when the clutch assembly of FIG. 2 is in an engaged condition.

The regenerative self-energizing clutch assembly 16 includes a cam element 88 which is secured to the side gear 56 by any conventional means and has an annular cam surface 92 (see FIG. 3). The cam surface 92 is formed with alternating recesses 94 and protruding portions 96 as will be hereinafter described. The clutch element 70 is provided with a similar annular cam surface 98 having alternating protruding portions 100 which cooperate with the recesses 94 in the cam element 88 and recesses 102 which cooperate with the protruding portions 96 of the cam element 88 as will be hereinafter described.

When the clutch assembly 16 is in the disengaged position as shown in FIG. 2, the clutch member 70 rotates with the cam element 88 and consequently the side gear 56. In the disengaged position the frictional clutch surfaces 74, 76 are spaced from each other as shown in FIG. 2, so that relative rotation between the side gear 56 and carrier 12 is not retarded.

To rotate the clutch element 70 and cam element 88 at the same rotational speed when the clutch assembly 16 is in the disengaged position, a pair of biasing springs 120 and 122 (see FIGS. 2 and 4) are provided. Accordingly, the biasing spring 120 includes an axially extending connector or body portion 126 which is fixedly secured to the clutch element 70. A pair of arms 130 and 132 project circumferentially from the body portion 126. These arms 130 and 132 are provided with arcuate end portions 136 and 138 which engage recesses 142 and 144 (FIG. 4) in the cam element 88 to thereby mount the clutch element 70 on the cam element 88. When the clutch element is in the disengaged condition, the end portions 136 and 138 of the arms 130 and 132 engage the recesses 142 and 144 to connect the clutch element 70 to the cam element 88 for rotation therewith relative to the carrier 12.

Upon initial movement of the clutch element 70 relative to the cam element 88, the springs 120, 122 provide a relatively small biasing force. However, the springs 120, 122 are of such a stiffness that as the end portions of the spring arms are cammed outwardly, the biasing force resisting relative movement between the clutch element 70 and the cam element 88 increases substantially. Therefore, a relatively small force can be utilized to initiate relative rotation between the clutch and cam elements. However, due to the increasing resistance exerted by the springs 120, 122, the force required to continue relative movement between the clutch element 70 and cam element 88 is greater than the force required to initiate this relative movement.

In the illustrated embodiment of the invention, actuation of the clutch assembly 16 from the disengaged condition toward the engaged condition is initiated by an actuator 150 (see FIG. 2) upon the occurrence of a predetermined speed of relative rotation between the gear 56 and carrier 12 or between the side gears. The illustrated actuator 150 comprises a viscous coupling between the clutch surfaces 74, 76 on the clutch element 70 and the clutch surfaces 78, 80, respectively, on the carrier 12. In addition, a viscous coupling is formed between an end surface 154 of the clutch element 70 and a generally parallel end surface 156 at the bottom of the recess 84 in the carrier 12. The viscous coupling between these surfaces is effected by a suitable shear fluid which fills the gear chamber 32.

Figure 4:
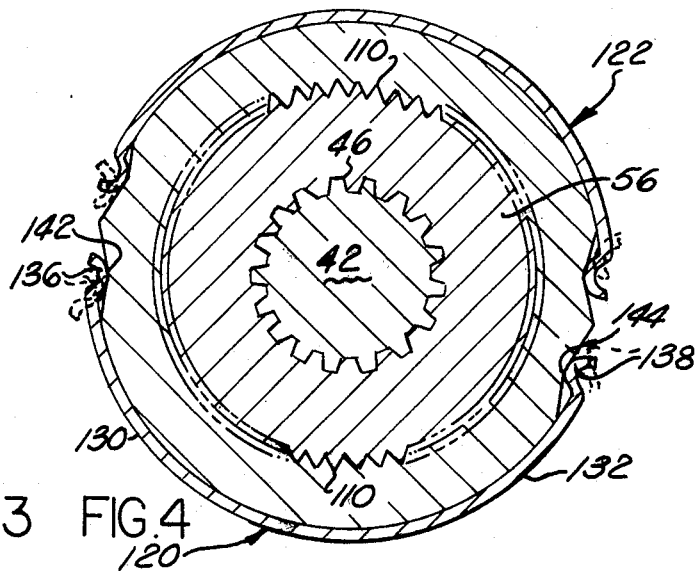
FIG. 4 is a sectional view of a biasing spring for urging the clutch assembly of FIG. 2 to the disengaged condition.

The viscosity of the shear fluid is such that when the clutch element 70 is rotated at a predetermined speed relative to the carrier 12 by rotation of the gear 56 and cam element 88, the drag forces exerted by the viscous shear fluid are sufficient to provide an initial actuating force which, while being relatively small, is of sufficient magnitude to just overcome the relatively small initial retaining force exerted by the biasing springs 120 and 122 (see FIG. 4). Thereupon, limited relative rotational movement occurs between the clutch element 70 and the cam element 88. The initial actuating force provided by the actuator 150 is insufficient to overcome the increased biasing effect exerted by the springs 120 and 122 after this initial relative movement between the clutch element 70 and cam element 88. Therefore if only the initial actuating force was applied, the clutch element 70 would not move through a sufficient distance relative to the cam element 88 to fully engage the cam assembly 16 and the cam assembly would remain in an intermediate condition between the disengaged and fully engaged conditions.

Figure 5:
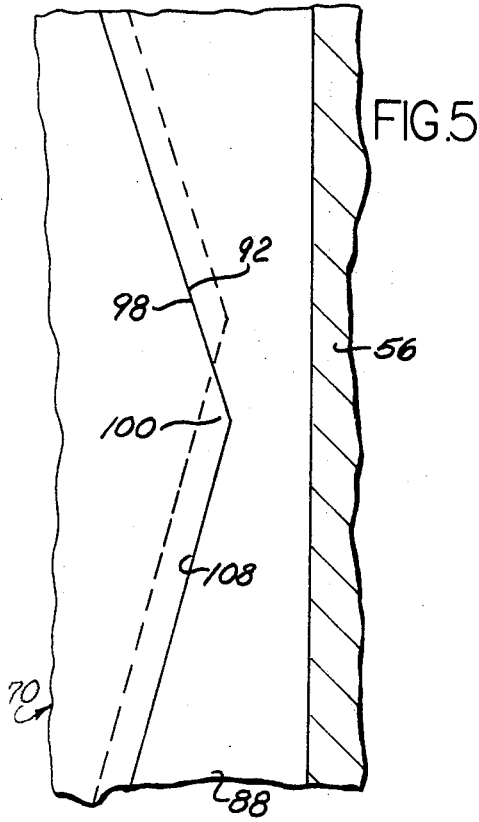
FIG. 5 is an enlarged schematic view further illustrating the relationship between the clutch element and the cam element.

Although the initial actuating force provided by the actuator 150 is insufficient to operate the clutch assembly 16 to the fully engaged condition, the initial actuation of the clutch assembly 16 causes it to generate self-energizing forces to continue the relative movement between the clutch element 70 and cam element 88 against the increasing biasing effect of the spring members 120 and 122. To provide for the generation of this self-energizing force, the complemental clutch surfaces 74, 76, 78 and 80 are moved toward each other by the interaction between the cam element 88 and clutch element 70 during initial actuation of the clutch assembly 16. As the space between the clutch surfaces is reduced, the drag forces on the clutch element 70 are increased to move it relative to the cam element 88. This relative movement brings the outwardly protruding portions 100 of the clutch element 70 and the recesses 94 of the cam element 88 into contact. Thus, the point 106 on the clutch element 70 and the point 108 on the cam element 88 (see FIG. 5) are brought into abutting engagement by actuation of the clutch assembly 16 from the disengaged condition to the engaged condition.

Abutting engagement of the sloping portions of the cam surface 92 on the cam element 88 against similarly sloping portions of the cam surface 98 on the clutch element 70 causes an axially directed force to be applied against the clutch element 70. This axially directed force presses the clutch surface 74, 76 on the clutch element 70 further toward the clutch surfaces 78 and 80 formed on the carrier 12. As was previously mentioned, this increases the drag forces between the clutch surfaces on the cam element 70 and carrier 12 retards relative rotation between the carrier 12 and clutch element 70.

After the regenerative self-energizing clutch 16 is initially actuated by the actuator 150, the clutch operates in a self-energizing manner as will be hereinafter described to automatically increase the frictional retarding force until there is no relative rotation between the gears and the carrier 12.

When the clutch member 70 moves axially towards the carrier 12, the retarding force between the clutch surfaces 74, 78 of the clutch member and carrier 70, 12 respectively increases. Thus, the clutch surfaces 74 and 76 are spaced from the clutch surfaces 78 and 80 when the clutch 16 is in the fully disengaged condition. In this spaced apart condition, only viscous shear drag forces are transmitted between the clutch surfaces to retard relative rotation between the carrier 12 and side gears 54 and 56.

As the clutch surfaces 74 and 76 move toward the clutch surfaces 78 and 80 due to the interaction between the cam surfaces 96 and 98, the viscous drag forces on the clutch surfaces 74, 76 increase. Still further movement of the clutch surfaces 74 and 76 toward the clutch surfaces 78 and 80 results in mechanical friction engagement between high points and irregularities on the surfaces 74 and 76 and high points on the surfaces 78 and 80. Of course, this engagement between high points and irregularities on the clutch surfaces increases the dynamic coefficient of friction between the clutch surfaces with a corresponding increase in the force retarding relative rotation between the side gears 54 and 56 and the carrier 12 before the clutch 16 is fully engaged.

This increasing drag or retarding force provides for self-energization and smooth engagement of the clutch assembly. The coefficient of friction increases from viscous shear friction levels to boundary friction levels prior to lock in an intermediate condition and then static friction levels in the fully engaged condition. During operation, the dynamic coefficient of friction between the clutch surfaces is constantly changing to promote smooth engagement of the clutch. Of course, in the fully engaged condition the clutch surfaces 74, 76, 78 and 80 are disposed in abutting frictional engagement and are firmly held against relative rotation by the relatively large static coefficient of friction between the clutch surfaces. This increasing retarding force resulting from the increasing dynamic coefficient of friction will cause the retardation of the clutch member 70 to react against the cam member 88. The cam surfaces 96, 98 are designed so that this self-energizing interaction between the members 70, 88 will produce further axial movement of the clutch member 70 and thereby increase the retarding frictional force. This regenerative self-energizing action continues until a speed-torque balance between the driving and driven members is automatically attained.

This method of automatically effecting a speed-torque relation between the carrier 12 and the side gears 54, 56 and consequently the shafts 40, 42 is a self-energizing action because the power for creating an axial force on the friction clutch member 70 is derived from the momentum inherent in the power members themselves. The action is also cumulative because the initially created torque or "simulated friction cone force" applied by the actuator 150 reacts on the members 88, 70 cause relative rotation therebetween and operate the cams 92, 98. This relative rotation produces axial movement of the member 70 which consequently increases the friction between the carrier 12 and the member 70. This increase in retarding torque acts to relatively rotate the cams 92, 98 still more to provide further axial movement of the clutch member 70, which in turn acts to increase the retarding torque and so on.

The axle shaft 40 is operatively connected by the gear train 14 to the side gear 54 and carrier 12 (FIG. 1). Of course, the side gear 56 is directly connected to the axle shaft 42. Therefore, any tendency of the axle shaft 40 to rotate relative to the axle shaft 42 when the clutch assembly 16 is engaged results in an interaction between the cam surfaces 92 and 98 (FIG. 6) to urge the clutch surfaces 74 and 76 on the clutch element 70 into firmer frictional engagement with the clutch surfaces 78 and 80 on the carrier 12. This increases the rotation retarding or holding action of the engaged clutch assembly 16 and thereby prevents relative rotation between axle shafts 40 and 42.

It is obvious that the angle of climb of the cam surfaces 96, 98 will determine the amount of axial movement of the clutch member 70 for a given angular movement of the clutch member 70 with respect to the member 88. To provide a regenerative self-energizing clutch 16 of the present invention, the cam angle is given a value which provides for the axial movement of the clutch member 70 by power derived from the side gear 56 with a mechanical advantage in favor of the clutch member 70.

To provide the regenerative self-energizing features of the present invention, the actual angle given to the cams will, of course, be determined by the conditions under which the device is installed and operated. Taking all of these parameters into account, there is a critical cam angle, above which no mechanical advantage exists, in favor of the clutch member 70. Below the critical cam angle, a mechanical advantage is provided, as pointed out above, and results in providing a regenerative self-energizing clutch 16.

It has been discovered that for one representative set of operative conditions, one angle of the cam at the outer peripheral portion 93 for a clutch which is regenerative and self-energizing is 10°. This outer cam angle is defined as the angle between an arcuate line 95 lying on the outer peripheral portion 93 of the cam surface 98 and an arcuate line 97 passing through a plane perpendicular to the rotational axis of the clutch member 70 and passing through the outer peripheral peak of the protruding portion 100.

To provide the preferred form of the cam surface 98 of the present invention, it should be understood that the cam angle, as hereinabove described, increases at points inwardly spaced from the outer periphery of the cam surface and toward the rotational axis of the member 70. Such a cam angle change is necessary due to the decrease in the circumferential distance. For example, at the pitch diameter of the cam surface 98, the cam angle will be approximately 12½° for an outer peripheral cam angle of 10°.

It should be understood that the cam surface 92 of the member 88 is formed in a corresponding manner to that hereinabove described in connection with the cam surface 98 of the clutch member 70. It also should be understood that other cam angles can be used for different design and operational parameters.

The cam surfaces 92, 98 are formed so that the clutch will operate regardless of which wheel spins. For example, if the wheel connected to the shaft 42 spins and looses traction with the road, that side gear 56 will rotate at a greater speed than either the carrier 12 or the side gear 54. When this relative rotation exceeds a predetermined level, the actuator 150 will initiate actuation of the self-energizing clutch system in one direction to retard such relative rotation. If on the other hand the wheel connected to the shaft 40 spins, the side gear 54 and the carrier 12 will rotate at a greater speed than the side gear 56. When this relative rotation exceeds a predetermined level, the actuator 150 will actuate the self-energizing clutch system in the other direction to retard such relative rotation. Thus, the cam surfaces are provided with cam angles on each side of the protruding portion which provide for a regenerative self-energizing clutch system 16 which is capable of operating in both directions.

When the clutch assembly 16 is operated to the engaged condition, the arcuate end portions 136 and 138 of the spring arms 130 and 132 remain in engagement with the recesses 142 and 144 (see the dashed line position of FIG. 4). The pressure relationship between the arcuate end portions 136 and 138 of the spring arms 130 and 132 and sloping sides of the recesses 142 and 144 tends to reverse the previous relative rotation between the clutch element 70 and cam element 88 to thereby bias the clutch assembly 16 toward the disengaged condition. It should be understood that the biasing spring 122 cooperates with the clutch element 70 and cam element 88 in much the same manner as does the biasing spring 120. Once the speed of relative rotation between the gear 56 and carrier 12 has been reduced, the drag forces exerted by the viscous shear fluid are also reduced. Upon a sufficient reduction in the drag forces, the biasing springs 120 and 122 are able to reverse the previous relative rotation between the clutch element 70 and cam element 88 to actuate the clutch assembly 16 to the disengaged condition of FIG. 2. The clutch element 70 then rotates with the gear 56 relative to the carrier 12 and is moved axially outwardly for a small distance by the effect of the viscous shear fluid on the surface of the clutch element.

In view of the foregoing description, it can be seen that the regenerative self-energizing clutch assembly 16 is operable from a disengaged condition in which the carrier 12 and side gear 56 are freely rotatable relative to each other to an engaged condition in which the clutch assembly 16 drivingly interconnects the carrier and gear to retard relative rotation therebetween. Upon the occurrence of a predetermined speed of relative rotation between the gear 56 and carrier 12, the actuator 150 rotates the clutch element 70 relative to the cam element 88 to initiate operation of the clutch assembly 16 to the engaged condition. In the engaged condition, the cam surface 92 on the cam element 88 engages the cam surface 98 on the clutch element 70 to prevent further relative rotation between the clutch and cam elements and to press the clutch element axially into the recess 84 formed in the carrier 12. The axial pressure against the clutch element 70 forces the conical clutch surfaces 74 and 76 into abutting frictional engagement with the conical clutch surfaces 78, 80 of the carrier. This frictional engagement is automatically increased by the regenerative self-energizing clutch assembly 16 until the gear 56 and carrier 12 is interconnected through the clutch and cam elements 70 and 88.

Having described my invention, I claim:

1. A drive mechanism comprising a carrier, differential gearing mounted on said carrier, said differential gearing including a pair of side gears and at least one pinion gear meshing therewith, self-energizing clutch means operable from a fully disengaged condition enabling relative rotation to occur between said carrier and one side gear through an intermediate condition to an engaged condition in which said self-energizing clutch means prevents relative rotation between said carrier and said one side gear, said self-energizing clutch means including a first clutch surface mounted for rotation with said carrier and a second clutch surface mounted for rotation with said side gear, said first and second clutch surfaces being spaced apart by a first distance when said self-energizing clutch means is in the disengaged condition and being disposed in an abutting frictional relationship when said self-energizing clutch means is in the engaged condition to prevent relative rotation between said carrier and said one side gear, said first and second clutch surfaces being ineffective to prevent relative rotation between said carrier and said one side gear when said self-energizing clutch means is in the intermediate condition, cam means interposed between said clutch surfaces and one side gear and mounted for rotational movement relative to said one side gear to effect loading of said clutch surfaces, spring means biasing said cam means against rotation relative to said one side gear, and speed-responsive actuator means for providing an initial actuating force to effect rotation of said cam means relative to said one side gear against the bias of said spring means to effect relative movement between said first and second clutch surfaces to operate said self-energizing clutch means from the disengaged condition to the intermediate condition in response to a predetermined rate of relative rotation between said carrier and said one side gear, said actuator means being ineffective to provide an actuating force of sufficient magnitude to move said cam means against said spring bias to operate said self-energizing clutch means from the disengaged condition to the engaged condition, said self-energizing clutch means including means for automatically generating a self-energizing force to continue rotation of said cam means relative to said one side gear and thereby continue loading of said clutch surfaces in response to actuation of said clutch means to the intermediate condition to thereby press said first and second clutch surfaces toward each other under the influence of a force which is greater than said actuating force and thereby operate said clutch means to the engaged condition.

2. A drive mechanism as defined in claim 1 wherein said cam means includes a cam member having cam surfaces thereon which cooperate with complementary cam surfaces on said side gear which effect axial movement of said cam member to thereby effect loading of said cam surfaces on rotation of said cam member relative to said side gear.

3. A drive mechanism as defined in claim 2 wherein said cam surfaces comprise a series of inclined cam surfaces spaced circumferentially of said cam member and said side gear and which surfaces are inclined at an angle in the order of 10° relative to a radial plane through said side gear and cam member.

* * * * *